US012454380B2

(12) United States Patent
Gropper et al.

(10) Patent No.: US 12,454,380 B2
(45) Date of Patent: Oct. 28, 2025

(54) METHOD OF OPERATING A PACKAGING LINE AND PACKAGING LINE SUITABLE THEREFOR

(71) Applicant: MULTIVAC SEPP HAGGENMUELLER SE & CO. KG, Wolfertschwenden (DE)

(72) Inventors: Daniel Gropper, Illertissen (DE); Pascal Schilling, Leutkirch (DE)

(73) Assignee: Multivac Sepp Haggenmueller SE & Co. KG, Wolfertschwenden (DE)

( * ) Notice: Subject to any disclaimer, the term of this patent is extended or adjusted under 35 U.S.C. 154(b) by 215 days.

(21) Appl. No.: 18/511,013

(22) Filed: Nov. 16, 2023

(65) Prior Publication Data

US 2024/0158120 A1 May 16, 2024

(30) Foreign Application Priority Data

Nov. 16, 2022 (DE) ......................... 102022130350.0

(51) Int. Cl.
*B65B 57/16* (2006.01)
*B26D 7/32* (2006.01)
*B65B 35/50* (2006.01)
*B65B 63/00* (2006.01)

(52) U.S. Cl.
CPC ................ *B65B 57/16* (2013.01); *B26D 7/32* (2013.01); *B65B 35/50* (2013.01); *B65B 63/00* (2013.01)

(58) Field of Classification Search
CPC ......... B65B 57/16; B65B 35/50; B65B 63/00; B65B 37/44; B65B 9/04; B65B 5/06; B65B 25/06; B65B 35/04; B65B 57/00; B26D 7/32; B26D 5/00; B26D 7/30; B26D 2210/02; G05B 19/41865; G05B 2219/45048
USPC ........................................................... 83/23
See application file for complete search history.

(56) References Cited

U.S. PATENT DOCUMENTS

2022/0411203 A1* 12/2022 Hartmann ............ B26D 7/0625

FOREIGN PATENT DOCUMENTS

| | | | | |
|---|---|---|---|---|
| DE | 102010055394 A1 * | 6/2012 | ............... | B26D 7/32 |
| DE | 102022106471 A1 * | 9/2023 | ............. | B65B 35/04 |
| EP | 2420365 A1 * | 2/2012 | ............... | B26D 7/32 |

* cited by examiner

*Primary Examiner* — Ghassem Alie
(74) *Attorney, Agent, or Firm* — Brooks Kushman P.C.

(57) ABSTRACT

In order to avoid a decrease of cycle frequency of a packaging machine within a packaging line caused by a previous interruption of a slicer's on-slice operation, e.g. during its loading, special residual buffers for additional buffering of portions compared to normal operation may be released by a controller shortly before the interruption. For example, non-buffer positions for portions on buffer bands may be released, or portion positions on non-buffer bands may be released.

20 Claims, 11 Drawing Sheets

METHOD OF OPERATING A PACKAGING LINE AND PACKAGING LINE SUITABLE THEREFOR

CROSS-REFERENCE TO RELATED APPLICATIONS

This application claims foreign priority benefits under 35 U.S.C. § 119(a)-(d) to German patent application number DE 102022130350.0, filed Nov. 16, 2022, which is incorporated by reference in its entirety.

TECHNICAL FIELD

The disclosure relates to a packaging line comprising:

a packaging machine, a slicing machine, such as a slicer, which also comprises a discharge unit, and an infeed unit in between.

Both the discharge unit and the infeed unit consist of a plurality of conveyor belts arranged one behind the other in the direction of travel through the machine and, in the case of multi-track machines, also of a plurality of conveyor belts arranged side by side transversely to one another.

In practice, such an infeed unit is called an inserter or an infeed line. The infeed unit and the discharge unit of the slicing machine together form a transport route over which the portions must be transported from their creation to their insertion into or onto the packaging element.

The slicer is often referred to below, but this is not intended to limit the disclosure to this design of slicing machine.

BACKGROUND

In the case of such a packaging line, too, the focus is on its performance, usually specified in terms of the cycle time with which the packaging elements, which generally move forward step by step, are moved in the packaging machine.

This is because the packaging machine is usually a thermoforming packaging machine in which, immediately upstream of the infeed station at which the portions are stored on or in the packaging elements, a strip of thermoformable plastic foil is thermoformed in portions at a standstill, as a result of which packaging troughs are designed in the foil band, usually several packaging troughs in succession per track per thermoforming operation in the direction of travel.

The number and arrangement of packaging trays produced in a single thermoforming operation, or the corresponding number and arrangement of portions to be placed in these trays, is referred to as the format. Since these are usually multi-track slicing machines and also multi-track packaging machines, the troughs and corresponding portions form into a two-dimensional format.

Since, due to the step-by-step thermoforming process (thermoforming cycle), the foil band also moves forward step-by-step at the infeed station, a complete format of portions must be inserted into the corresponding format of trays at the infeed station each time it moves forward (infeed cycle=thermoforming cycle).

On the one hand, the infeed unit provides the representation of the portions in the correct formats and at the correct locations of the infeed unit, and on the other hand, it represents a buffer for portions and whole formats, in order that in the event of an interruption of the slicing operation—which regularly occurs when loading the slicer with one or more new product calibres—the packaging machine can continue to operate fed from this buffer.

For this reason, the slicing power or cutting capacity of the slicer is usually slightly higher than the infeed power or capacity of the packaging machine, in the case of a thermoforming packaging machine, usually its thermoforming power or capacity or other power limiting the packaging machine power.

Nevertheless, the average cycle frequency and thus the infeed power (with an inverse analogous increase in cycle time) of the packaging machine decreases when the cutting operation is interrupted, but not during the interruption, since during this time the packaging machine is fed from the buffer, but after the cutting operation has been resumed, since time is needed to close the gap between the last format in the inserter and the new portions produced on the transport route after the interruption.

This decrease in cycle frequency could be shortened by choosing the cutting power of the slicer much higher than the power of the packaging machine, which, however, represents a high additional effort on the part of the slicer.

Not all buffer belts within the infeed unit and, for the same reason, within the discharge unit can be considered as buffer bands, because a buffer belt must be able to transfer the one or more portions stored on it to the following band with positional accuracy even after a standstill.

Since the packaging elements, in particular the trough band, have a defined running speed during their movement phases, the last band of the infeed insertion unit, the so-called insertion band, which ejects the format on it, e.g. into the troughs, must also have the same running speed during insertion and thus frequently also the upstream bands, particularly buffer bands.

A conveyor band can therefore be ruled out as a buffer band because it is too short to bring a portion stored on it to this running speed when it is put into operation until the end of this conveyor band. If there is room for more than one portion on this buffer band in succession, only one or a part of these portion positions can be enabled as buffer positions, as the above condition is fulfilled for this, but one or some other buffer positions on this buffer band are not enabled for this, hereinafter referred to as non-buffer positions.

Similarly, a conveyor band cannot be used as a buffer band if it is not driven by a servo motor, since it cannot then be controlled precisely in terms of time and speed profile, which is why synchronous and positionally accurate transfer to a subsequent band is not possible.

Therefore—see FIG. 5—only certain conveyor belts within the packaging line are permitted as buffer belts, while the others, the so-called non-buffer belts, are not.

Functions such as weighing the portions, discharging reject portions, adjusting the portions running side by side to the track spacing of the packaging machine, rotating and aligning the portions, etc. are usually provided by the conveyor belts of the discharge unit of the slicer or the downstream first belts of the inserter infeed unit, in that these contain appropriately designed conveyor belts.

SUMMARY

It is therefore an object in accordance with the disclosure to provide a method for operating a packaging line which minimizes and in particular avoids the increase in the average cycle time of the packaging machine due to an interruption in the slicing operation of the slicing machine, and to provide a packaging line suitable for this purpose without significantly increasing the constructional expenditure for the packaging line.

With respect to the method of operating a packaging line, typically comprising as set forth:

a packaging machine with an infeed station in which a portion is stored on or in a package or packaging means, a single-track or multi-track slicing machine, in particular a slicer, for slicing slices from a calibre of product, including a discharge unit with a plurality of conveyor belts for the slices, which is capable of placing a plurality of slices at least partially on top of one another to form a portion, a horizontal infeed unit downstream of the infeed station for buffering and feeding the portions to the infeed station by means of a plurality of conveyor belts equipped with controllable servo drives, at least a part of which is used as a buffer band, wherein the discharge unit and the infeed unit together form a transport route for the portions, in normal operation, the slicing machine is operated only with such a real slicing capacity that—per track—the number of portions available on the transport route corresponds at most to the total number of depositing positions for one portion each, the buffer positions, available in the buffer route.

This ensures that in the event of an interruption of the infeed process at the infeed point and consequent immediate stop of the cutting operation, the portions present on the transport route upstream of the powder route can be transported further into the buffer route and can all be accommodated there.

Since the buffer belts there each have servo motors as drives, after a restart of the inserter operation, the contents of the buffer route can gradually be correctly inserted at the insertion point onto or into the packaging element.

The real cutting power or capacity is the separated number of slices per unit time and particularly per track. The maximum cutting power, which is limited by the maximum speed of the knife of the slicing, is usually somewhat higher.

However, in order to set the slicing machine to a given real cutting power, the speed of the knife is not reduced, but the speed is used, which would result in the maximum number of slices per time unit, if slices were also cut off with each rotation of the knife. However, such a number of empty cuts is provided—in which the knife does not cut off any slice due to lack of contact with the calibre—that instead of the possible maximum cutting power, the desired lower real cutting power is present.

A storage position for a portion is understood to be the room, in particular the extension in the direction of transport, at which a portion can be stored on a conveyor band. Thus, if there is room for two portions one behind the other in the direction of transport on one lane of a conveyor band, but there is no room for a third portion, this conveyor belt has two storage positions.

For example, if the buffer route comprises four buffer belts, each of which is long enough to have two storage positions for one portion each, the buffer route has a total of eight storage positions.

The existing object is achieved by the fact that in the special case of a foreseeable interruption of the cutting operation of the slicing machine, the slicing machine is temporarily operated with a real cutting power which is so much higher than the real cutting power that the number of portions per track in the buffer route reaches a special number which is higher by a predetermined special difference than the number of buffer positions on the buffer route.

The number of normal buffer positions on the buffer route together with the additional special difference released in special operation thus results in the increased special number of portions that may be present on the entire transport route at maximum, i.e.:

number of buffer positions+special difference=increased special number.

This solution is based on the assumption that during the short period of special operation, in which the transport route is more heavily occupied with portions than in normal operation, i.e. substantially the period of interruption of the cutting operation of the slicer, presumably no standstill of the infeed insertion unit and/or the discharge unit of the slicer will be additionally forced by other circumstances, but these will continue to run and the infeed insertion unit will continue to supply the packaging machine with formats by stepwise forward movement.

This continuously frees up buffer positions on the infeed inserter unit, because otherwise the portions—particularly those on non-buffer belts—would have to be discharged or at least manually inserted, as they could no longer be automatically transferred to the downstream belts with positional accuracy.

Preferably, the special difference is determined in such a manner that the special number per lane corresponds to a maximum of the total number of storage positions for portions available in the transport route. This ensures that a separate deposit position is also available for each portion present on the transport route.

To keep the described risk as low as possible, the period of increased occupancy is kept as short as possible. For this purpose, the preliminary period is preferably placed immediately before the stop of the cutting operation.

For the same reason, the length of the preliminary period is chosen in such a manner that the special number is reached only with the last cutting operation before the stop of the slicing operation.

Likewise, the preliminary period is started particularly as late as possible, in particular so late that just the desired special number can be built up until the interruption.

As a rule, the packaging means are moved forward step by step in the packaging machine with receptacle of a format consisting of a plurality of portions—one behind the other in the transport direction and, in the case of a multi-track machine, a plurality of portions next to one another in the transverse direction. In this process, the formats are assembled from individual portions with the help of the infeed unit.

Then the special number per track corresponds at most to the portion number per track of two formats, at most to the portion number per track of only one format, in order not to drive up the additional occupancy too much.

If, however, the discharge unit and/or the infeed unit come to a standstill during the period of special operation, i.e. during the increased occupancy of the transport route, the portions on the non-buffer belts are normally discharged from the packaging line and/or placed manually on the packaging means when the line is restarted.

A packaging line for the production and packaging of portions each comprising one or more slices separated from a calibre of product generally comprises, as is well known:

a packaging machine with an infeed station in which a portion can be stored on or in a package or packaging element, a single-track or multi-track slicing machine, in particular a slicer, for cutting slices from a product calibre, including a discharge unit with usually a plurality of conveyor belts for the slices, including a portioning band, which is capable of placing a plurality of slices at least partially on top of one another to form a portion, a horizontal infeed unit for buffering and feeding the portions to the infeed station by means of several conveyor bands, at least a part of which can be used as a buffer band, a controller for controlling moving parts of the packaging line.

With regard to such a packaging line, the existing object is achieved according to the disclosure in that the packaging line, in particular its controller, is designed in such a way that it is capable of performing the method described above.

This makes it possible to achieve the advantages described on the basis of the method.

Preferably, the packaging line comprises for this purpose:

a portioning band for at least partial stacking of slices to form portions in particular:

a subsequent discharge band for transporting the portion away from the portioning band and/or a transfer band for transferring a portion to a subsequent unit, in particular a discharge feeder unit and/or a weighing band with a scale for weighing a portion and/or a rocker band for ejecting a portion and/or a distribution band or spreading band for spacing the portions from the track spacing of the slicer to the track spacing of the packaging machine and/or a balancing band for arranging the corresponding portions on the different tracks in the same longitudinal position and/or a format band for the position-accurate assembly of portions to at least one format and/or at least one buffer band for buffering at least one portion, in particular at least one entire format, and/or an infeed band for dropping a format onto at least one packaging element.

With the help of these conveyors in the packaging line, the intended purpose can be achieved very easily.

BRIEF DESCRIPTION OF THE DRAWINGS

Embodiments in accordance with the disclosure are described in more detail below by way of example. In the figures.

DETAILED DESCRIPTION

Figure 1A:
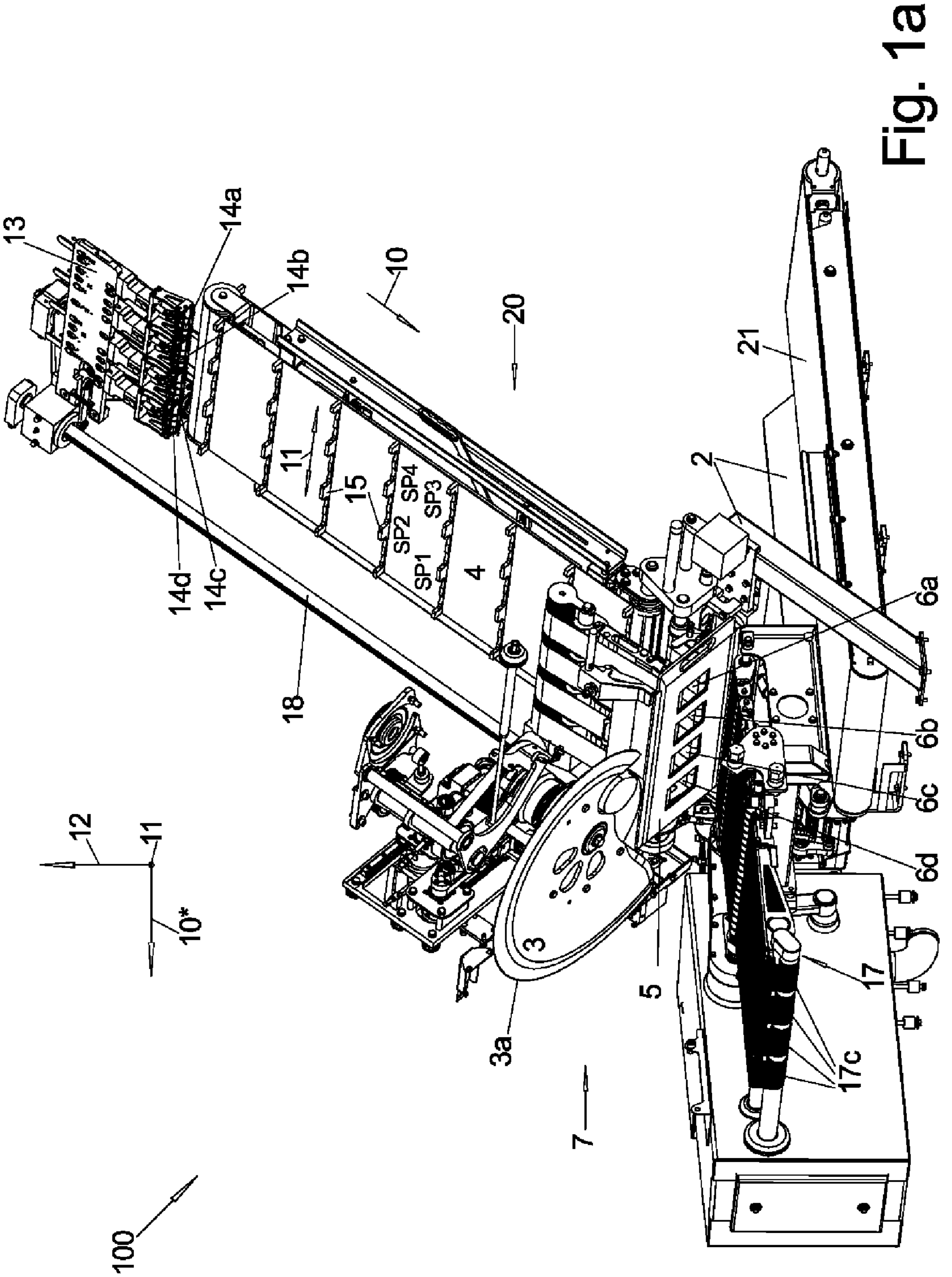
FIGS. 1*a, b* show a slicing machine in the form of a slicer in accordance with prior art in different perspective views, with feed band folded up into the cutting position.
Figure 1B:
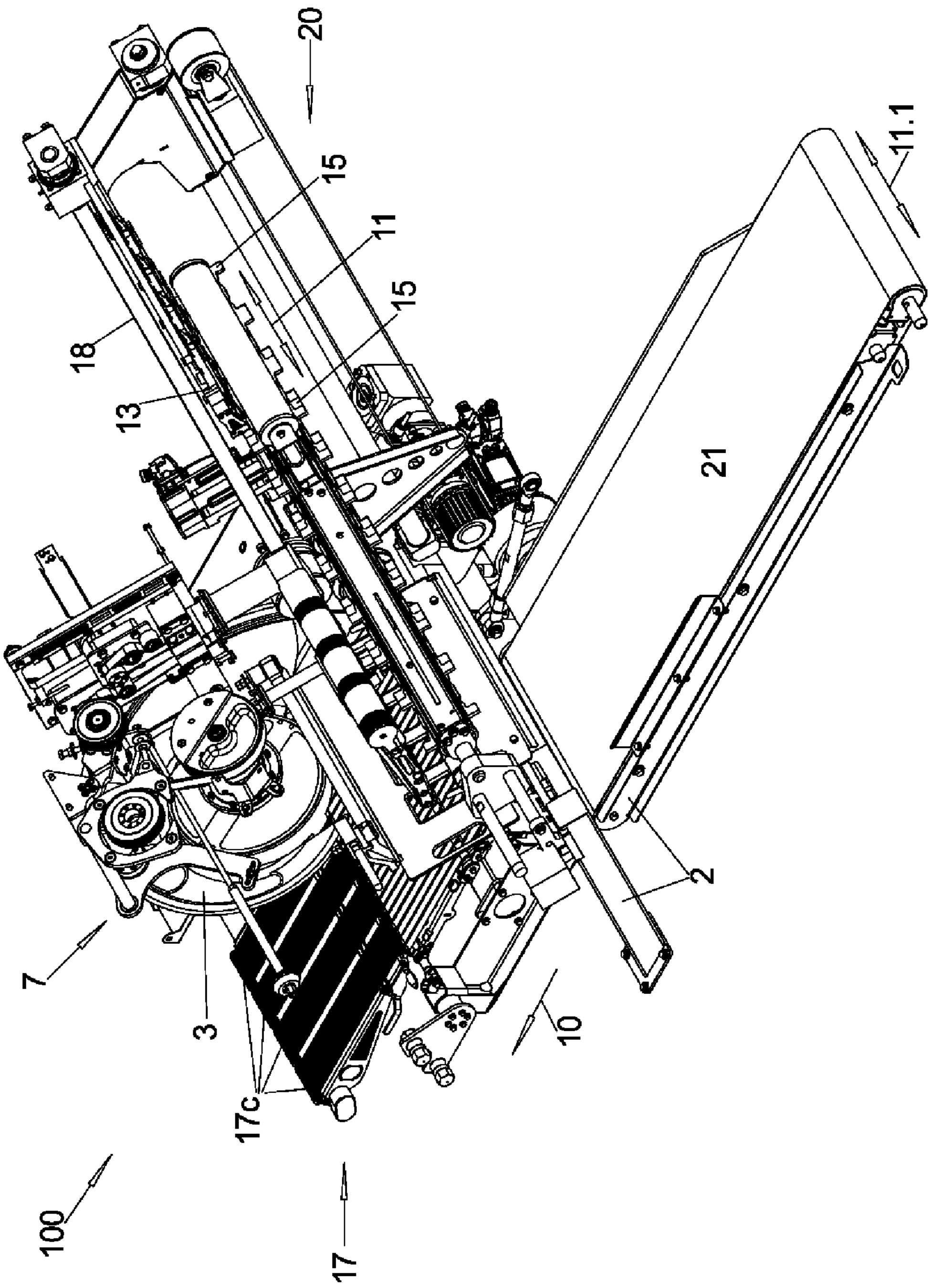

FIGS. 1*a*, 1*b* show different perspective views of a known multi-track slicer 100 for simultaneous slicing of several product calibres K—not shown in these two figures—on one track SP1 to SP4 each side by side and storing in shingled portions P each consisting of several slices S with a general direction of travel 10* through the slicer 1 from right to left.

Figure 2A:
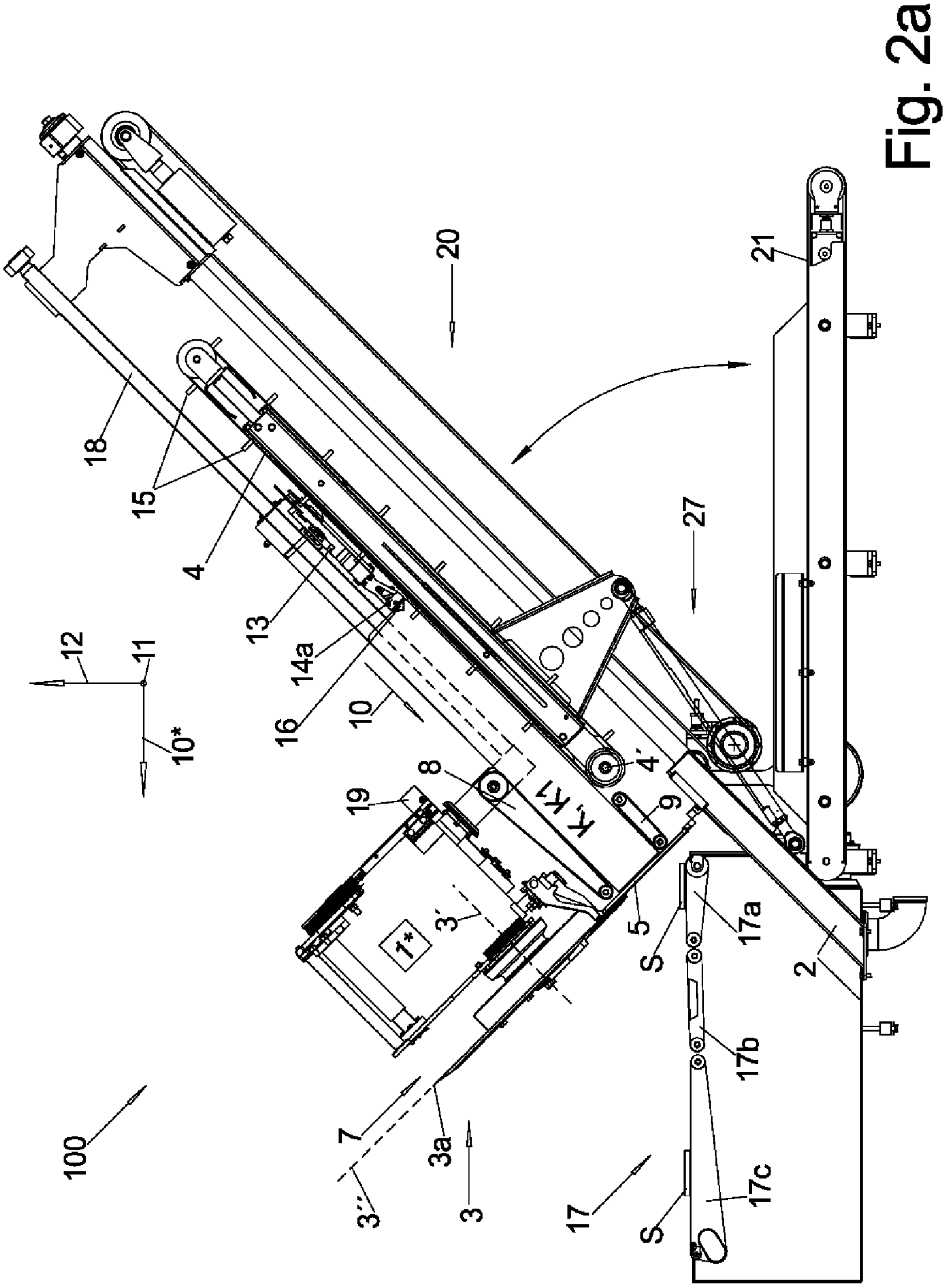
FIGS. 2*a, b* show the slicing machine of FIGS. 1*a, b* in side view with the panels removed so that the various conveyor bands can be seen more clearly, whereas in FIG. 2*b* the feed band is folded down into the loading position.

FIG. 2*a* shows—with the K calibre inserted—a side view of this slicer 1, omitting covers and other parts not relevant to the disclosure, which are fastened to the base framework 2 in the same manner as all other units, so that the functional parts, especially the conveyor bands, can be seen more clearly. The longitudinal direction 10 is the feed direction of the calibres K to the cutting unit 7 and thus also the longitudinal direction of the calibres K lying in the slicer 1.

It can be seen that the basic structure of a slicer 100 according to the prior art is that a cutting unit 7 with a knife 3 rotating about a knife axis 3', in this case a sickle knife 3, is fed with several, in this case four, product calibres K lying transversely to the feed direction 10 next to one another on a feed conveyor 4 with spacers 15 of the feed conveyor 4 between them by this feed unit 20, from the front ends of which the rotating knife 3 cuts off a slice S with its cutting edge 3*a* in each case in one operation, that is to say almost simultaneously.

Figure 2B:
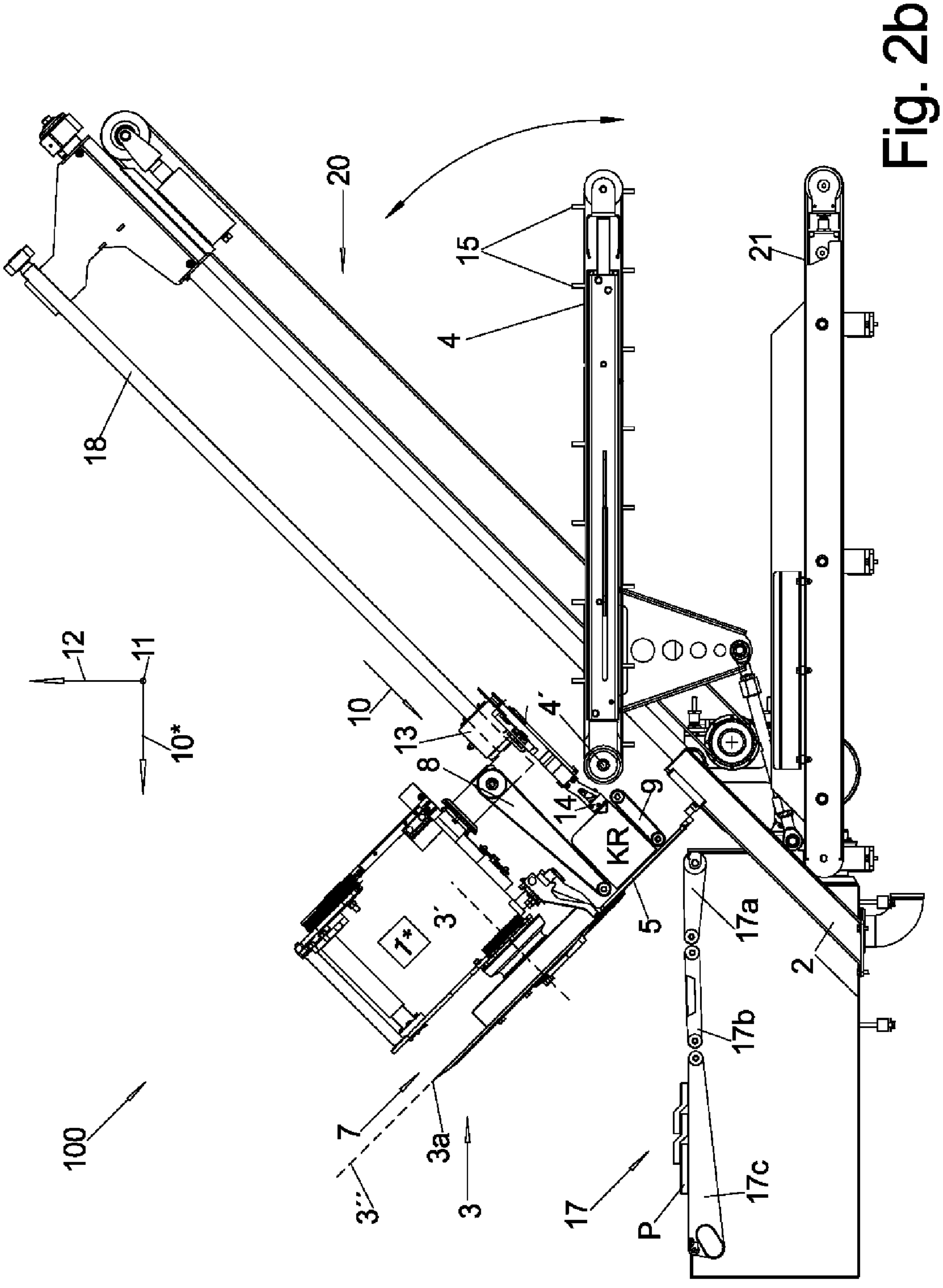

For the cutting of the product calibres K, the feed conveyor 4 is in the cutting position shown in FIGS. 1*a, b* as well as 2*a*, which is oblique in the side view with the cutting side front end lying low and the rear end lying high, from which it can be folded down about a pivot axis 4' extending in its width direction, the first transverse direction 11, which is located in the vicinity of the cutting unit 7, in accordance with FIG. 2*b* into an approximately horizontal loading position.

The rear end of each calibre K lying in the feed unit 20 is—see FIGS. 2*a, b*—held positively in each case by a gripper 14*a*— d with the aid of gripper claws 16 which can be activated and deactivated. The grippers 14*a*-14*d* are fastened to a common gripper carriage 13, which can be tracked along a gripper guide 18 in the feed direction 10.

In this case, both the feed of the gripper slide 13 and of the feed conveyor 4 can be driven in a controlled manner, wherein, however, the actual feed speed of the calibres K is effected by a so-called upper and lower product guide 8, 9 which is also driven in a controlled manner and which engages the upper side and lower side of the calibres K to be cut open in their front end areas near the cutting unit 7.

Figure 3A:
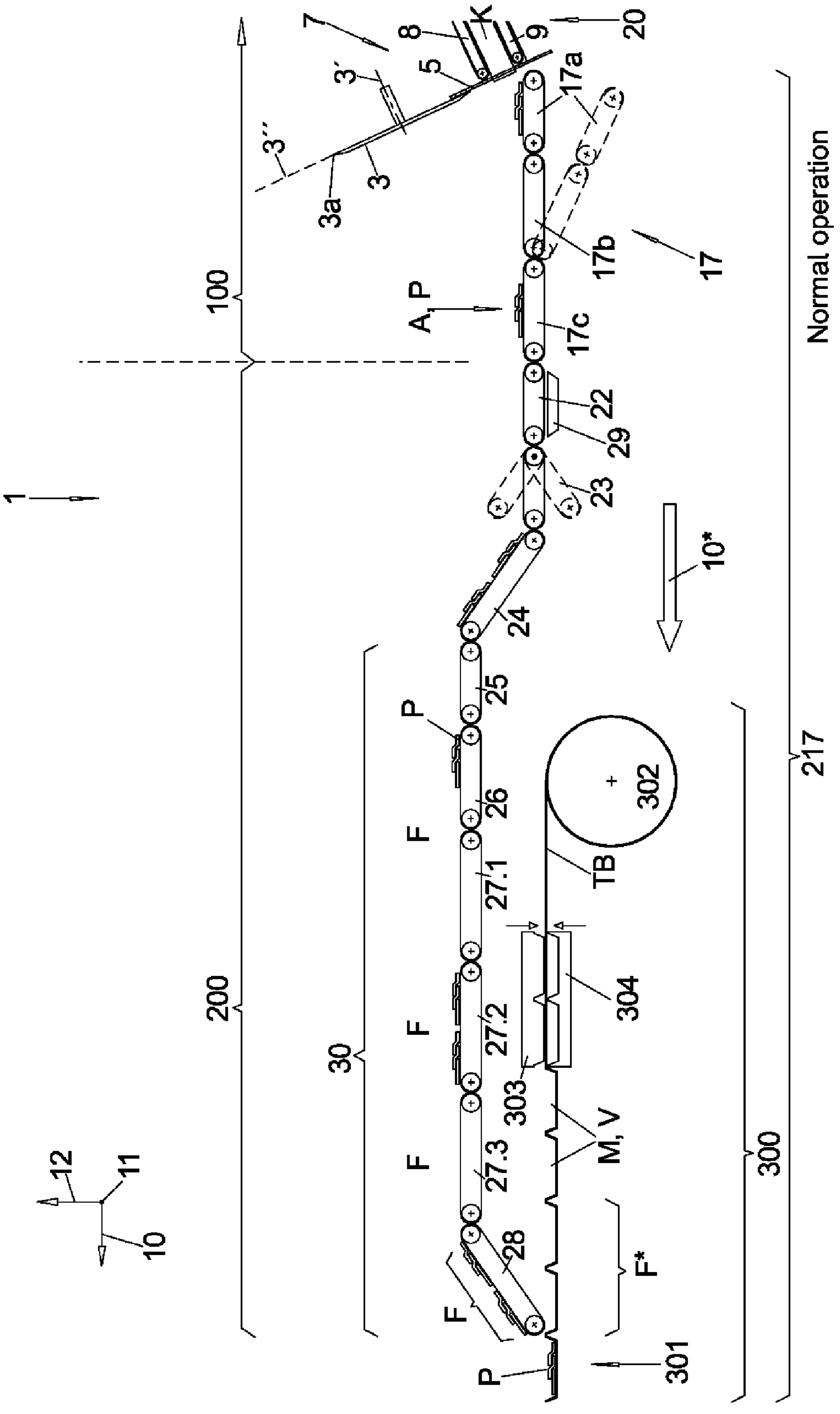
FIG. 3*a* shows a packaging line in side view with loading condition in normal operation.

The front ends of the calibres K are guided in each case through a so-called product opening 6*a-d* of a plate-shaped cutting frame 5, wherein directly in front of the front end face of the cutting frame 5, which faces obliquely downwards, extends the cutting plane 3" in which the knife 3 rotates with its cutting edge 3*a* and thus cuts off the projection of the calibres K from the cutting frame 5 as a slice S, as can be seen better in the principle representation of FIGS. 3*a, b*. The cutting plane 3" extends perpendicular to the upper run of the feed conveyor 4 and/or is spanned by the two transverse directions 11, 12 to the feed direction 10.

In this case, the inner circumference of the product openings 6*a-d* serves as a counter cutting edge of the cutting edge 3*a* of the knife 3.

Since both product guides 8, 9 can be driven in a controlled manner, particularly independently of one another and/or possibly separately for each track SP1 to SP4, these determine the—continuous or clocked—feed speed of the calibres K through the cutting frame 5.

Below the feed conveyor unit 20—see FIGS. 1*a, b*—there is usually an approximately horizontally extending residue conveyor 21, which starts with its front end below the cutting frame 5 and directly below or behind the discharge unit 17 and with its upper run thereon—by means of the drive of one of the discharge conveyors 17 against the direction of travel 10—transports away falling residues to the rear.

The slices S, which are at an angle in the room when they are cut off, fall onto a discharge unit 17 which starts below the cutting frame 5 and extends in the direction of travel 10*, and which in this case consists of several discharge units 17*a, b, c* arranged one behind the other with their upper runs approximately aligned in the direction of travel 10*, of which the first discharge unit 17*a* in the direction of travel 10 can be designed as a portioning band 17*a*.

The slices S can hit the discharge unit 17 individually and spaced apart from one another in the direction of travel 10* or, by appropriate control of the portioning belt 17*a* of the discharge unit 17—whose movement, like almost all moving parts, is controlled by the controller 1*— form shingled (see FIGS. 3*a, b*) or stacked portions P by mostly stepwise forward movement of the portioning belt 17*a*.

FIG. 3*a* shows in side view a packaging line 1 with a feed insertion unit 200 in the direction of travel 10* subsequently to a slicer 100, with its discharge unit 17, as well as a packaging machine 300 indicated by the trough belt, into the troughs M of which the feed insertion unit 200 stores the portions P, in particular a portion P of three slices S each as represented.

Figure 3B:
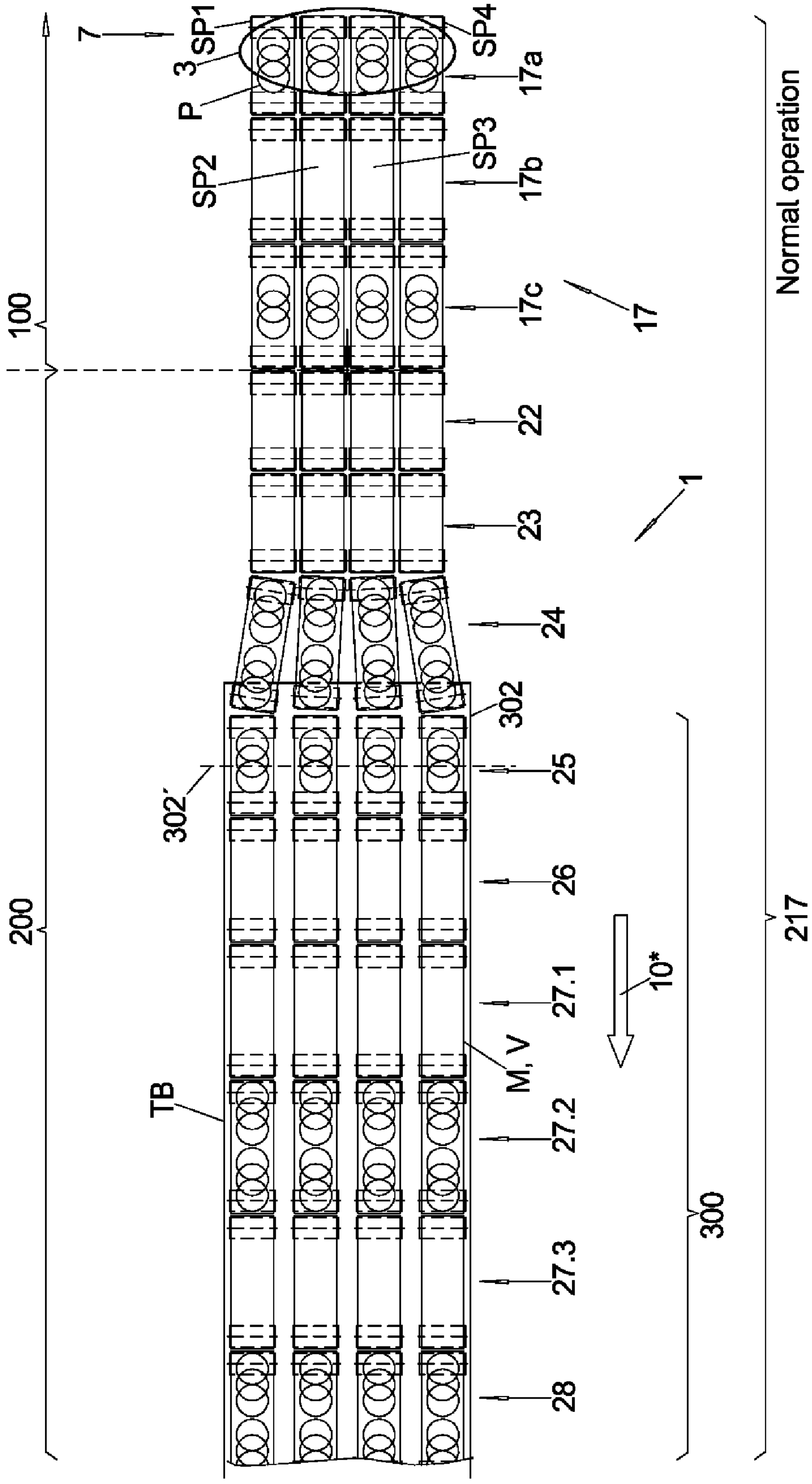
FIG. 3*b* shows the packaging line of FIG. 3*a* in a four-track design in top view.
Figure 4A:
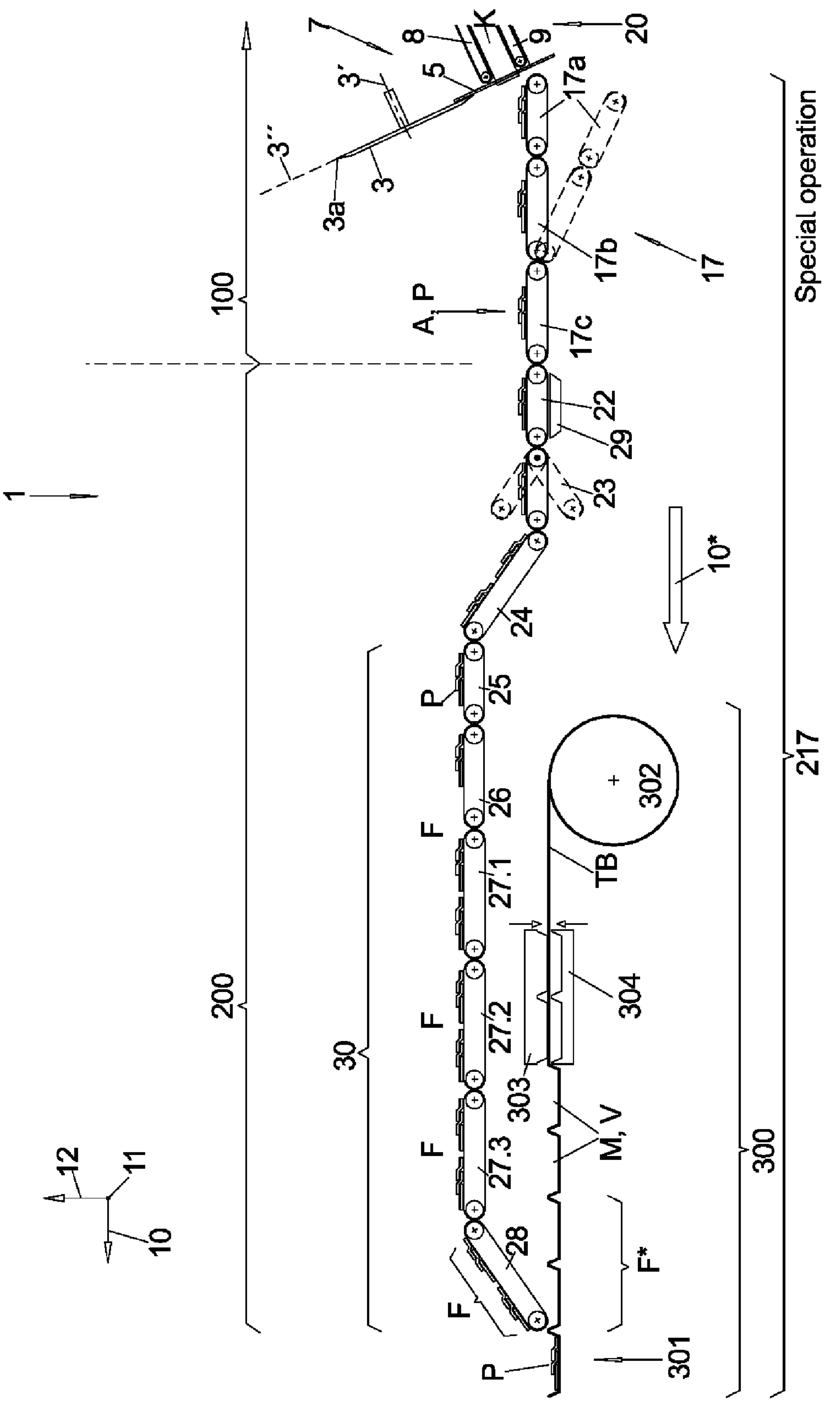
FIG. 4*a* shows a packaging line in side view with loading condition in special operation just before an interruption of the cutting operation.
Figure 4B:
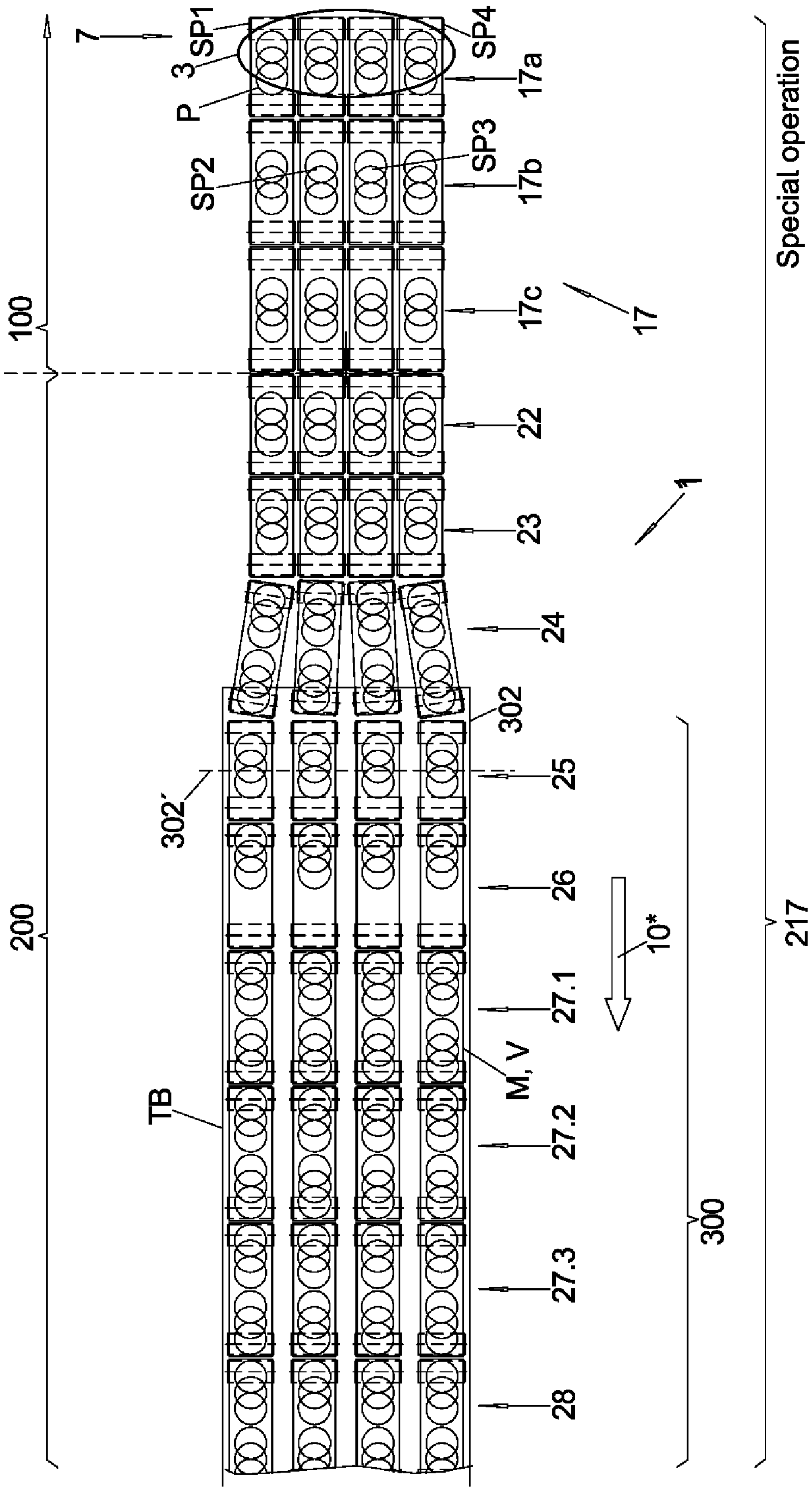
FIG. 4*b* shows the packaging line of FIG. 4*a* in a four-track design in top view.

The side view of FIGS. 3*a*, 4*a* applies to a single-lane packaging line 1 as well as to a multi-lane packaging line 1 in the viewing direction of these figures with several lanes behind one another, approximately a four-lane packaging line 1, as shown in the top view of FIGS. 3*b*, 4*b* and analogously to FIGS. 3*a*, 4*a* as well as for the slicer in FIGS. 1*a* to 2*b*.

The packaging line 1 shown in FIGS. 3*a, b*, 4*a, b* comprises the following conveyor belts on each of the tracks SP 1 to SP4 from the cutting unit 7 downstream:

- portioning band 17*a*, discharge band 17*b* and transfer band 17*c* as part of the discharge unit 17, which is generally still part of the slicer 100,
- downstream, others immediately downstream, thereof, preferably in that order,
  - a weighing band 22 having a scale 29 for weighing a portion P thereon,
  - a controlled discharge band 23, preferably designed as a controlled pivoting rocker band 23, for discharging an off-weight portion P,
  - a distribution band 24, often referred to as a spreader band 24, to bring the portions adjacent to one another in the transverse direction 11 from the track spacing of the slicer 100 to the track spacing of the packaging machine 300,
  - a balancing band 25 to bring the portions P located next to one another in the transverse direction 11 to exactly the same longitudinal position in the direction of travel 10*,
  - format band 26 to bring the appropriate number of portions P—in this case two portions P in succession per track—together and to the correct longitudinal spacing for a format F, thus forming finished formats F.

Downstream of this is the actual buffer route 30, consisting of one or more, in the present case three, buffer bands 27.1-27.3, wherein in the present case the equalizing or balancing band 25 and the format band 26 also still belong to the buffer route 30, since they also—apart from the above-mentioned functions—also fulfil a buffer function as buffer bands.

The buffer bands 27.3 and 27.2 can each accommodate at least one format F of portions P, whereas the buffer band 27.1 can only accommodate a part of a format F, in this case only one portion, while the immediately preceding so-called format band 26 can also accommodate a portion P, so that both can buffer a format F together, in particular in the correct relative position of the two portions P of which it consists with respect to each other, especially in the direction of travel 10*.

At the end, the infeed band 28, which is directed downwards at an angle, stores the format F, consisting in this case of eight portions P, on the thermoforming band TB passing underneath it in the analogue format F* from troughs M of the thermoforming band TB, for which the thermoforming band TB and the infeed band 28 are brought to the same speed in the direction of travel 10*.

It goes without saying that the successive bands are so closely arranged to one another that they are able to take a corresponding portion P from the upstream previous band and pass it on to the downstream next band.

The length of the format F, F* in the direction of travel 10* and/or the cycle frequency as well as the speed in their movement phases are determined by how many troughs M are deep-drawn one after the other in the direction of travel 10*— and of course next to one another in the transverse direction 11, this usually simultaneously over all tracks—in the deep-drawing station between the upper die 303 and the lower die 304 from the flat deep-drawing band TB.

In the direction of travel 10*, a format F* comprises two troughs M one behind the other per track SP1-SP4 and, similarly, a format F comprises two portions P per track SP1-SP4.

Here, FIGS. 3*a, b*—per track SP1-SP4—show the loading quantity of portions P on the entire transport route 217 in normal operation at an arbitrary point in time, because the 9 portions per track SP1-SP4 shown here can also be on conveyor bands other than those shown.

In normal operation, there are 9 portions in the present case because the buffer route 30, i.e. from the compensation or balancing band 25 to the infeed band 28, offers 9 storage positions for one portion P each, including per track SP1-SP4.

The portions distributed over the entire transport route 217 in the state shown could therefore be transported further until they are all within the buffer route 30, from where a position-accurate transfer and insertion into the troughs M as packages or packaging means V would be possible even after a standstill of bands of the transport route.

At the time shown, therefore, in FIG. 3*b*, there are within the buffer route 30:

two portions P in succession per track on the inserter band 28, two portions P in succession per track on the buffer band 27.2, a portion P on the compensation band 25, wherein the bands 25 and 26 together fulfil the function of a format band on which, in total, two portions P are arranged in succession per track SP1-SP4 at the correct distance from one another.

Upstream of buffer route 30, there is the following per track:

two portions P on the distributor band 24 a portion on the transfer band 17*c* of the discharge unit 17 and a portion on the portioning band 17*a* of the discharge unit 17.

In contrast, FIGS. 4*a, b* show the loading amount of portions P on the entire transport route 217 in special operation at the time the cutting operation is stopped or immediately before.

In this case, 8 portions per track were released as a special difference, so that compared to normal operation with 9 portions per track in accordance with FIGS. 3*a, b*, there are now 17 portions per track on the transport route in FIGS. 4*a, b*.

The additionally released 8 portions are the portions created last, wherein during their production the remaining portions P were transported on accordingly, so that above all the buffer route 30 is now loaded more heavily, in the present case completely, in that now, in comparison with the state of FIGS. 3*a, b*, additionally also on the buffer bands 27.1 and 27.3 in each case two portions P are present one behind the other, i.e. on these two buffer bands in each case one format F is present and also on the format band 26 one portion P per track is present.

Figure 5:
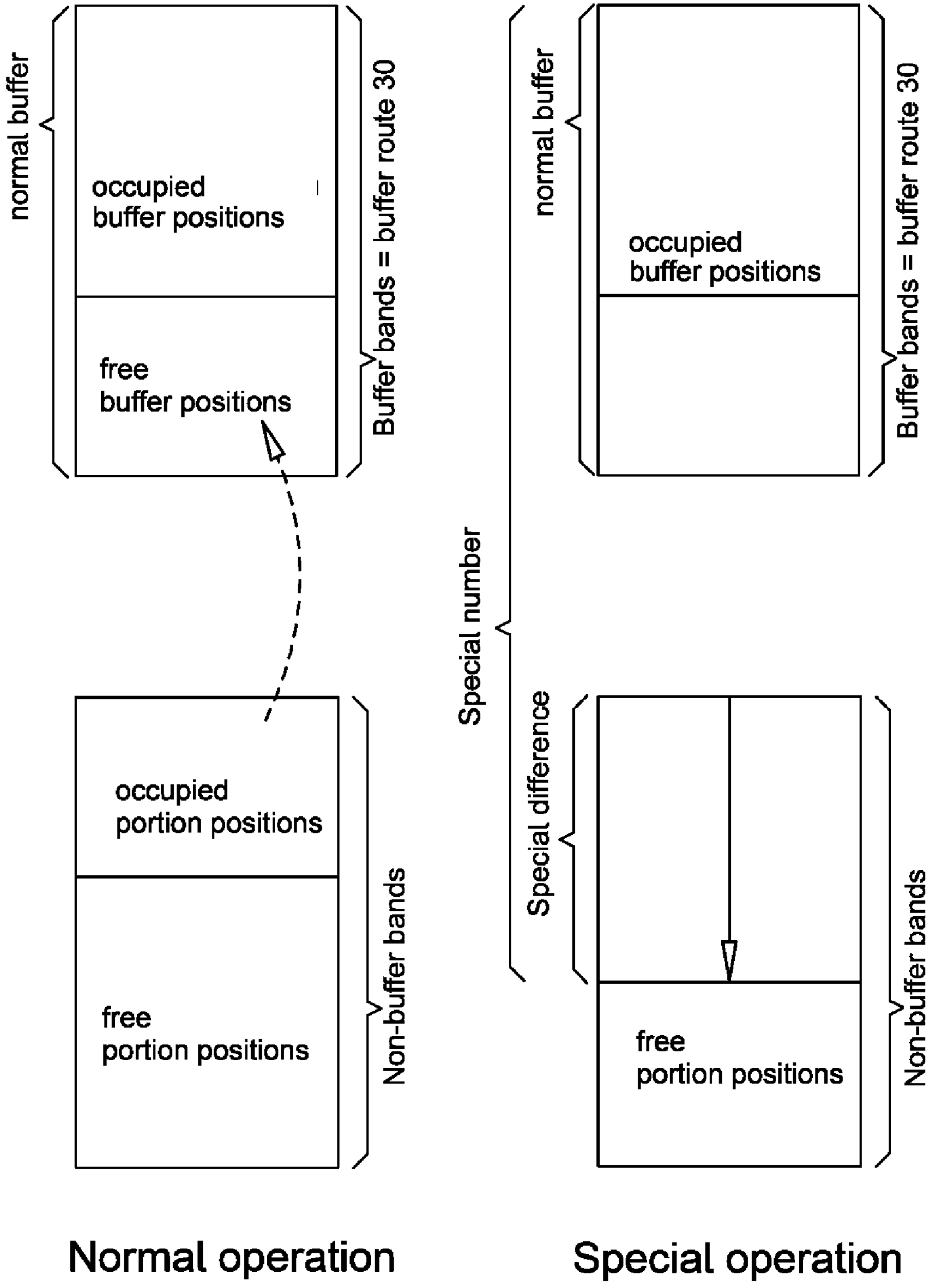
FIG. 5 shows a block diagram with contained positions.

FIG. 5 shows on the left for normal operation that in cutting operation—in which the packaging line 1 represents a rolling system—only so many storage positions for portions, i.e. buffer positions, are occupied in the normal buffer consisting of the buffer bands of the buffer route 30, that the free buffer positions still present there would find room therein for at least the—in the present case exactly the—number of the portion positions present on the upstream non-buffer bands 17*a* to 24, the occupied portion positions, if they were further transported there—as necessary for example for the special operation—in accordance with the dashed arrow in FIG. 5 left.

In the special operation shown in FIG. 5 right, this has already been done, so that the normal buffer in the form of buffer route 30 is fully occupied.

However, for the special operation, a special difference of further portion positions for the receptacle of portions P to be produced is now released and also filled, which together with the normal buffer results in the released special number. In the present case, the released special difference is the total number of free portion positions that the non-buffer bands have.

From this it is clear that—provided there is no standstill of the infeed unit 200 during the interruption of the cutting operation—during the interruption of the cutting operation the packaging machine 300 can be supplied with formats F not only from the buffer route 30, but from the entire infeed unit 200.

Meanwhile, the free portion positions created mainly in the upstream area of the infeed unit 200 are closed by the slicer 100—which then creates portions P faster than they are consumed by the packaging machine 300—faster after the cutting operation is resumed than during normal operation until the cutting operation is interrupted.

Figure 6A:
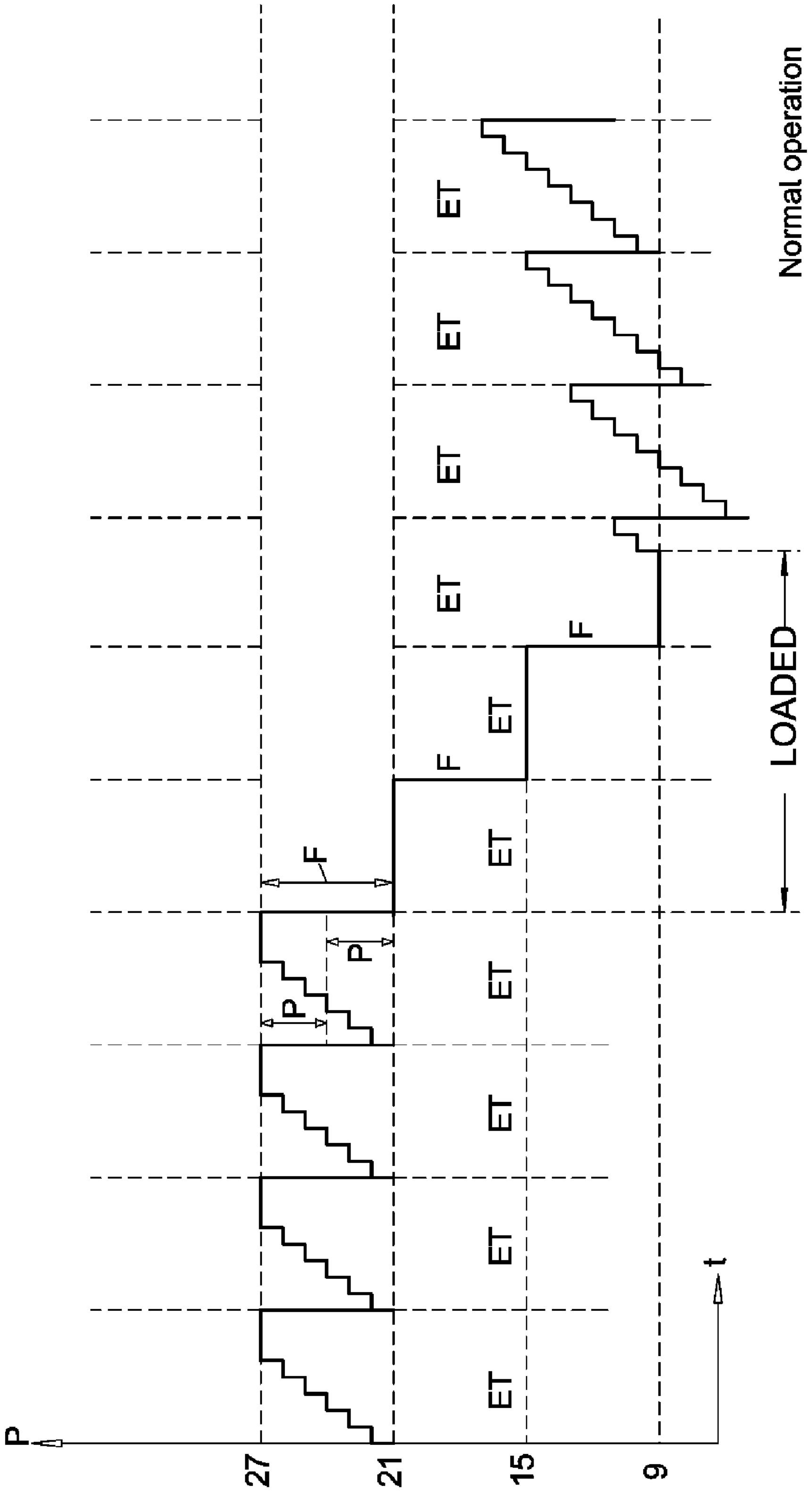
FIGS. 6*a, b* show time diagrams with the loading of a transport route in normal operation and in special operation.

How this is done and for what purpose is illustrated by FIGS. 6*a, b* on the basis of the change over time of the portions P present on a track SP1-SP4 of another transport route with a higher loading capacity than the transport route 217 shown in FIGS. 3*a* to 4*b*, in particular during a standstill of the slicer 100, typically due to a necessary loading operation.

On the one hand, as in the case of the infeed line 1 in accordance with FIGS. 3*a* to 4*b*, also in FIGS. 6*a, b* the infeed unit 200 delivers a format F to the packaging machine 300 via its infeed band 28 after a respective infeed cycle time ET at the infeed station 301.

On the other hand, the slicer 100, which can produce one slice S per track at regular time distances corresponding to the circulation time of the knife, can produce more than the 6 slices per track required for one format, namely 8 slices, within an infeed cycle time ET. In normal operation, therefore, after production of the 6 slices required for a format F, two blank cuts are performed within an infeed cycle time ET, e.g. by retracting the calibre K slightly to the rear for this purpose and thus no longer making contact with the knife 3.

Thus, the occupancy of the transport route 217 with portions P changes cyclically, for example, between 21 and 27 portions.

If, in accordance with FIG. 6*a*, the slicer 100 is stopped in order to reload it—which in this case requires almost three infeed cycle times ET— formats F are removed from the transport route 217 in cycles during this period, as a result of which the occupancy in this case assumed in FIG. 6*a* has dropped to 5—with an otherwise usual occupancy between 21 and 27—when the generation of slices by the slicer 100 starts again.

Since, after loading, one wants to increase the average occupancy of the transport route 217 back to the same level and thus the same buffer size as before loading as a safety measure, no empty cuts are performed by the slicer 100 during the first infeed cycle times ET, so that it produces eight instead of six slices S per lane in one infeed cycle time ET.

As can be seen, a significant number of infeed cycle times ET are required to achieve occupancy of the transport route as it was prior to the interruption of operation of the slicer 100.

Figure 6B:
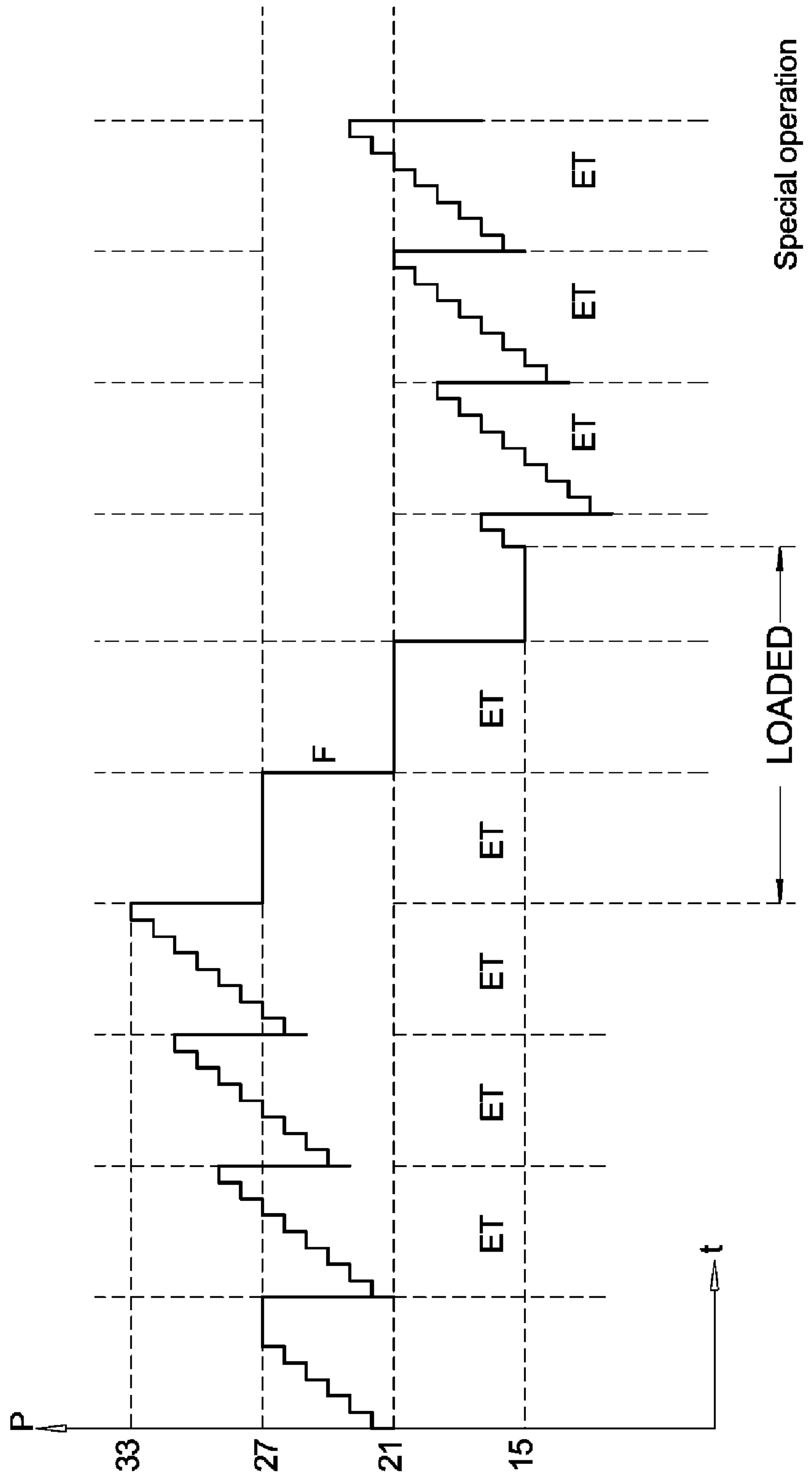

This is improved in accordance with the disclosure by introducing a special operation in accordance with FIG. 6*b*, in which the occupancy of the transport route with portions P is increased even before the—foreseeable—interruption of the cutting operation, in that—here in the last infeed cycle times ET before the interruption of the slicing operation—the slicer 100 no longer performs any empty cuts and produces—in this case again—eight instead of six slices S per infeed cycle time ET, whereby the transport route reaches an occupancy of 33 portions immediately before the interruption of the slicing operation.

With the same duration of the loading process, the loading at the end of the cutting operation thus only drops to 11, and accordingly, with appropriate operation of the slicer after the end of the interruption of operation of the slicer, initially without empty cuts, the original loading level is reached all the more quickly.

This advantage outweighs the disadvantage that during overcrowding of the transport route shortly before the slicer 100 stops, an additional stop of the infeed unit 200 would result in some portions P either having to be manually inserted into the packaging machine 300 or becoming rejects.

As one skilled in the art would understand, the controller 1*, as well an any other unit, machine, apparatus, element, sensor, device, component, system, subsystem, arrangement, or the like described herein may individually, collectively, or in any combination comprise appropriate circuitry, such as one or more appropriately programmed processors (e.g., one or more microprocessors including central processing units (CPU)) and associated memory, which may include stored operating system software and/or application software executable by the processor(s) for controlling operation thereof and/or for performing the particular algorithms represented by the various functions and/or operations (e.g., methods) described herein, including interaction and/or cooperation between any such controller, unit, machine, apparatus, element, sensor, device, component, system, subsystem, arrangement, or the like. One or more of such processors, as well as other circuitry and/or hardware, may be included in a single ASIC (Application-Specific Integrated Circuitry), or several processors and various circuitry and/or hardware may be distributed among several separate components, whether individually packaged or assembled into a SoC (System-on-a-Chip).

LIST OF REFERENCE NUMBERS

1 packaging line
1* controller
2 base framework
3 knives
3 axis of rotation
3" knife plane, cutting plane
3*a* cutting edge
4 feed conveyor, feed band
5 cutting frame
6*a-d* product opening
7 cutting unit
8 upper product guide, upper guide band
8.1 contact run, sub run
8*a* spectacle-side pulley
8*b* spectacle averted pulley
9 lower product guide, lower guide band
8.1 contact run, upper run
9*a* spectacle-side pulley
9*b* spectacle averted pulley
10 feed direction calibre
10* Direction of travel through machine
11 1. transverse direction, width direction
12 vertical
13 gripper unit, gripper slide
14,14 *a-d* gripper
15 spacer
16 gripper claw
17 discharge unit
17*a, b, c* conveyor band
17*a* portioning band
18 gripper guide
19 height sensor
20 feed unit
21 residual piece conveyor
22 cradle band
23 discharge band, rocker band
24 distributor band
25 compensation band
26 format band
27.1/.2/.3 buffer band
28 infeed band
29 scale
30 buffer route
100 slicing machine, slicer
200 infeed unit
217 transport route
300 packing machine
301 infeed station
302 supply roll
303 upper die
304 lower die
A article
ET infeed cycle time
F, F* format
K product, product calibre
M trough
S slice
SP1-SP4 track
TB deep drawing tape
P portion
V packaging means

What is claimed is:

1. A method for operating a packaging line comprising:

a packaging machine having an infeed station in which a portion is stored on or in a package;

a single-track or multi-track slicing machine for cutting slices from a product calibre, including a discharge unit with a plurality of conveyor belts one behind the other for the slices, wherein the discharge unit is operable to form portions that each include a plurality of the slices placed at least partially on top of one another; and a horizontal infeed unit downstream of the slicing machine in a direction of travel for buffering and feeding the portions to the infeed station by a plurality of conveyor bands, wherein, of the plurality of conveyor bands, those arranged within a buffer route and equipped with controllable servo drives comprise buffer bands;

wherein the discharge unit and the infeed unit together form a transport route for the portions, and where the method comprises: providing a controller configured to perform the following steps: operating the slicing machine in normal operation in which a cutting capacity is such that per track a number of portions present on the transport route corresponds at most to a number of deposit positions present in the buffer route for one portion each, the deposit positions being buffer positions; and in a case of a foreseeable interruption of cutting operation of the slicing machine, in a preliminary period before the interruption, temporarily operating the slicing machine with a cutting capacity which is higher in comparison to the cutting capacity during the normal operation, that per track a number of portions present in the transport route reaches a special number which is higher by a predetermined special difference than the number of buffer positions on the buffer route.

2. The method according to claim 1, wherein the preliminary period is placed immediately before the interruption of the cutting operation.

3. The method according to claim 2, wherein a length of the preliminary period is selected in such a manner that the special number is reached with a last cutting process before the interruption of the cutting operation.

4. The method according to claim 2, wherein the special number per track corresponds to a maximum total number of storage positions for portions available in the transport route.

5. The method according to claim 1, wherein a length of the preliminary period is selected in such a manner that the special number is reached with a last cutting process before the interruption of the cutting operation.

6. The method according to claim 5, wherein the special number per track corresponds to a maximum total number of storage positions for portions available in the transport route.

7. The method according to claim 1, wherein the special number per track corresponds to a maximum total number of storage positions for portions available in the transport route.

8. The method according to claim 1, wherein the preliminary period is started so late that the special number can just be built up until the cutting operation is interrupted.

9. The method according to claim 1, wherein packages are moved forward step by step in the packaging machine while receiving a format comprising several portions per track, with help of the infeed unit, portions are assembled into formats, and the special number per track corresponds at most to a portion number per track of two formats.

10. The method according to claim 1, wherein packages are moved forward step by step in the packaging machine while receiving a format comprising several portions per track, with help of the infeed unit, portions are assembled into formats, and the special number per track corresponds at most to a portion number per track of one format.

11. The method according to claim 1, wherein upon a standstill of the discharge unit and/or the infeed unit, the portions located on non-buffer bands are discharged from the packaging line when the packaging line is restarted.

12. A packaging line for production and packaging of portions, each comprising one or more slices separated from a product calibre, the packaging line comprising:

a packaging machine having an infeed station in which a portion can be stored on or in a package;

a single-track or multi-track slicing machine for cutting slices from the product calibre, including a discharge unit with multiple conveyor bands for the slices, the conveyor bands comprising a portioning band, which is configured to receive several slices at least partially on top of one another to form a portion;

a horizontal infeed unit downstream of the slicing machine in a direction of travel for buffering and feeding the portions to the infeed station by a plurality of conveyor bands, wherein, of the plurality of conveyor bands of the infeed unit, those arranged within a buffer route and equipped with controllable servo drives comprise buffer bands, and wherein the discharge unit and the infeed unit together form a transport route for the portions; and a controller configured to:

operate the slicing machine in normal operation in which a cutting capacity is such that per track a number of portions present on the transport route corresponds at most to a number of deposit positions present in the buffer route for one portion each, the deposit positions being buffer positions; and in a case of a foreseeable interruption of cutting operation of the slicing machine, in a preliminary period before the interruption, temporarily operate the slicing machine with a cutting capacity which is higher in comparison to the cutting capacity during the normal operation, so that per track a number of portions present in the transport route reaches a special number which is higher by a predetermined special difference than the number of buffer positions on the buffer route.

13. The packaging line according to claim 12, wherein the conveyor bands of the discharge unit further comprise, in addition to the portioning band a subsequent discharge band for transporting the portion away from the portioning band, and/or a transfer band for transferring a portion to the infeed unit.

14. The packaging line according to claim 12, comprising:

a weighing band with a scale for weighing a portion.

15. The packaging line according to claim 12, comprising a discharge band for discharging a portion.

16. The packaging line according to claim 12, comprising a distribution band or spreader band to bring portions running side by side to track spacing of the packaging machine.

17. The packaging line according to claim 12, comprising a balancing band to bring portions running side by side in the direction of travel to a same position.

18. The packaging line according to claim 12, comprising a format band for assembling portions into at least one format with positional accuracy.

19. The packaging line according to claim 12, comprising at least one buffer band for buffering at least one format.

20. The packaging line according to claim 12, comprising an infeed band for transferring a format onto at least one package.

* * * * *